United States Patent [19]

Johnson

[11] 4,441,846
[45] Apr. 10, 1984

[54] AUTO SPOUT AIMER WITH DELAY

[75] Inventor: Stanley J. Johnson, Cedar Falls, Iowa

[73] Assignee: Deere & Company, Moline, Ill.

[21] Appl. No.: 347,125

[22] Filed: Feb. 9, 1982

[51] Int. Cl.³ .............................................. B65G 67/22
[52] U.S. Cl. .................................................. 414/335
[58] Field of Search ........................ 414/334, 335, 345

[56] References Cited

U.S. PATENT DOCUMENTS

| | | |
|---|---|---|
| 3,166,204 | 1/1965 | De Buhr . |
| 3,786,945 | 1/1974 | Symonds .............................. 414/335 |
| 4,042,132 | 8/1977 | Bohman et al. ...................... 414/335 |
| 4,376,609 | 3/1983 | Bohman et al. ...................... 414/335 |

Primary Examiner—David A. Scherbel
Assistant Examiner—Edward M. Wacyra

[57] ABSTRACT

A crop-receiving wagon is pivotally attached to a forage harvesting machine with a pivotal crop discharging spout. A dual sensitivity spout-aiming control system maintains the spout-wagon angular relationship within first and second ranges during first and second ranges, respectively, of wagon-machine angles. A switching circuit switches the control system between its sensitivity modes in response to changes in the wagon-machine angle and includes a timer which delays the mode switching for a certain time period after a predetermined change in the wagon-machine angle. A gate circuit cooperates with the timer to reduce the delay period upon manual positioning of the spout.

6 Claims, 5 Drawing Figures

AUTO SPOUT AIMER WITH DELAY

BACKGROUND OF THE INVENTION

This invention relates to a control system for controlling the position of a crop discharge spout on an agricultural machine for directing material to a crop-receiving wagon pivotally attached thereto.

A previous developed variable sensitivity automatic feedback spout-aiming control system is described in U.S. patent application, Ser. No. 282,364, filed July 13, 1981, now U.S. Pat. No. 4,401,403 and assigned to the assignee of the present invention. It was found that when coming out of a slowly negotiated turn, this previous control system could switch from its high to low sensitivity modes before the wagon had straightened out behind the forage harvester, with the result that the spout would be allowed to remain misaligned with respect to the wagon tongue by a small amount. Although this small misalignment was not enough to cause crop spillage, it could tend to cause uneven wagon filling when the machine repeatedly turns in one direction. Therefore, it was desired to provide a spout-aiming system which would return the spout to a centered or neutral position at the completion of a turning maneuver, while retaining the dual sensitivity feature.

SUMMARY OF THE INVENTION

An object of the present invention is to provide a forage harvester with a dual sensitivity spout aimer which centers the spout upon completion of a turn.

Another object of the present invention is to provide a dual sensitivity spout aimer with a manual override operational mode.

These and other objects are achieved by the present invention which includes a dual sensitivity spout-aiming control system and a circuit for switching the sensitivity as a function of a wagon-machine angle. The circuit includes a timer for delaying the sensitivity switching for a predetermined delay time period after the wagon-machine angle decreases to a first threshold value. The timer provides no delay of the sensitivity switching when the wagon-machine angle increases to a second threshold value. A gating circuit and the timer cooperate to substantially reduce the delay period in response to manual positioning of the spout.

BRIEF DESCRIPTION OF THE DRAWINGS

FIG. 4 is a detailed circuit schematic of a portion of a control unit constructed according to the present invention and adapted for use in the control unit of FIG. 2, along with the circuit 64a shown in FIG. 3a.

DETAILED DESCRIPTION

Figure 1:
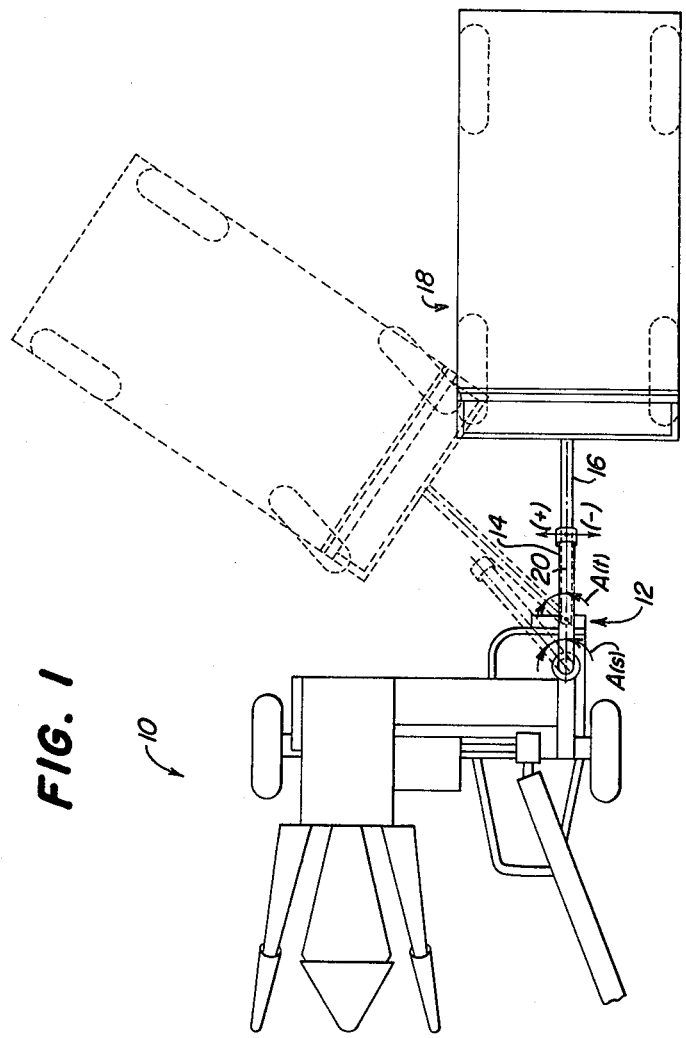
FIG. 1 is an illustration depicting a typical agricultural machine, such as a forage harvester, with a crop-receiving wagon pivotally attached thereto.

FIG. 1 shows a tractor-drawn forage harvester 10 which includes a drawbar 12 and a power-rotatable forage dispensing spout 14. The tongue 16 of a crop-receiving wagon 18 is coupled to the drawbar 12.

Figure 2:
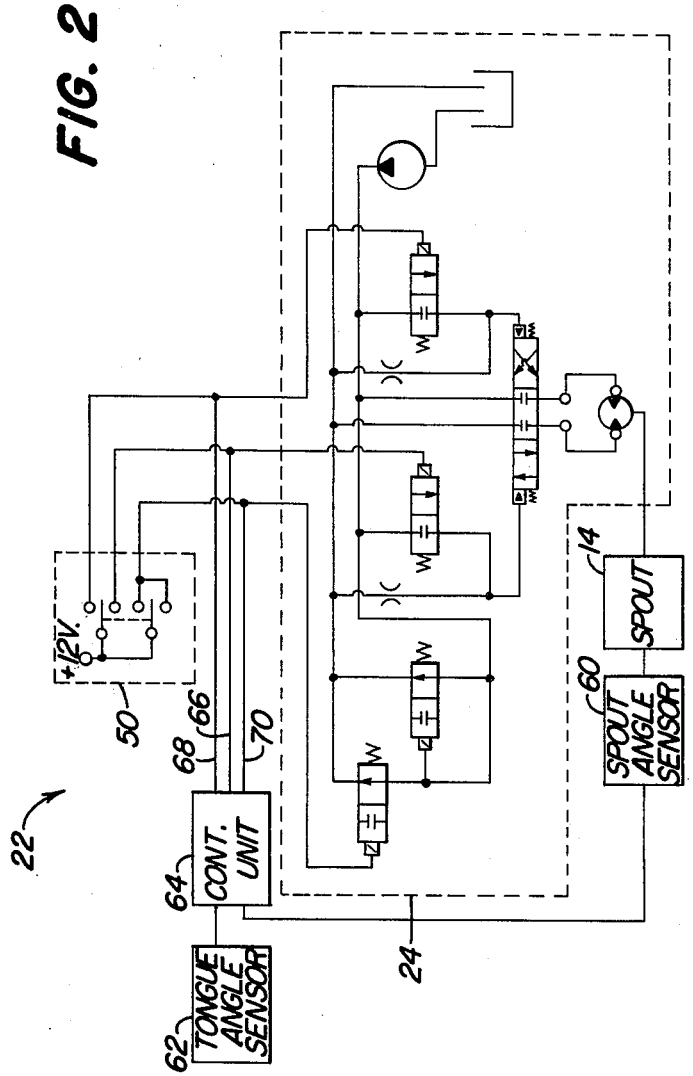
FIG. 2 is a schematic representation of a spout-aiming control system.

A spout-aiming control system 22 is shown in FIG. 2. For a full understanding of the control system 22, reference should be had to the U.S. patent application, Ser. No. 282,364, now U.S. Pat. No. 4,401,403 which is incorporated herein by reference. Briefly, the control system 22 includes a hydraulic system 24 and a control unit or circuit 64 which operates to control the position of spout 14 in response to signals from a spout angle sensor 60, a tongue angle sensor 62 and an operator-controlled switch module 51.

Figure 3A:
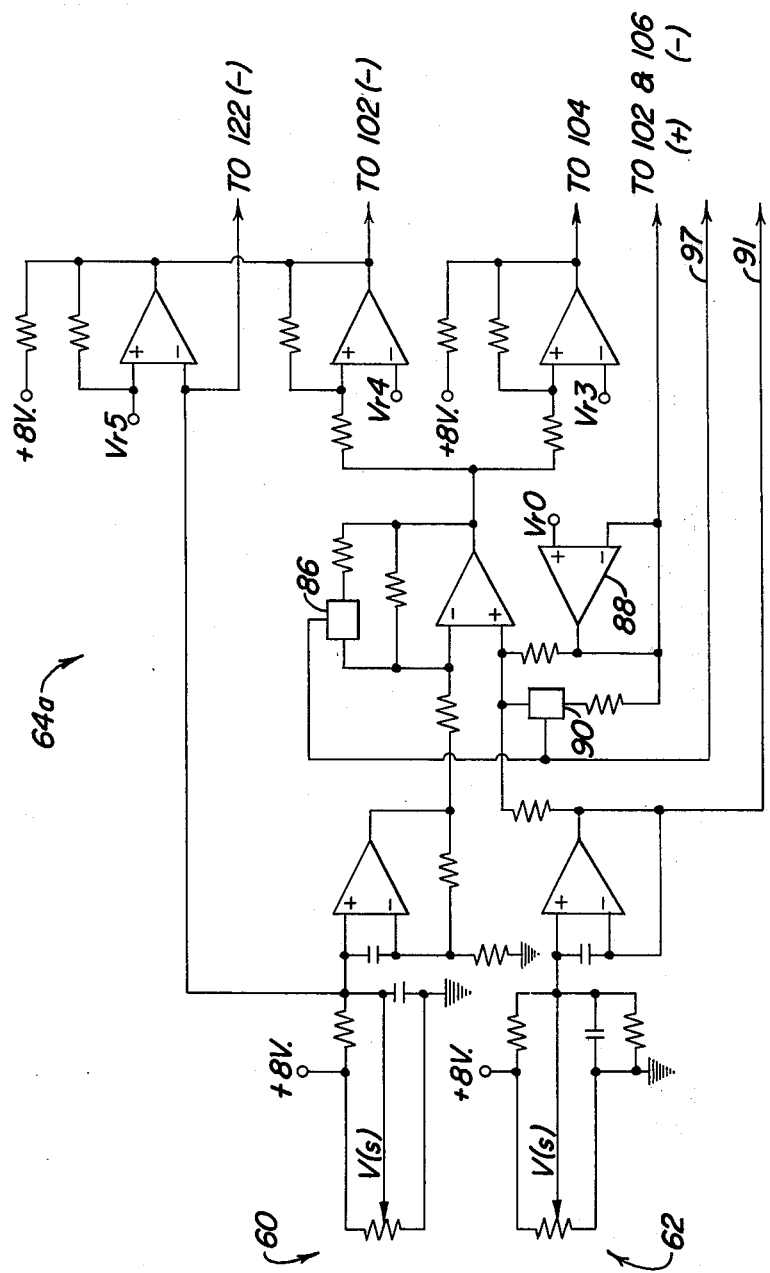
FIGS. 3a and 3b are detailed circuit schematics of portions 64a and 64b of a prior art control unit for use as the control unit 64 of the control system shown in FIG. 2.
Figure 3B:
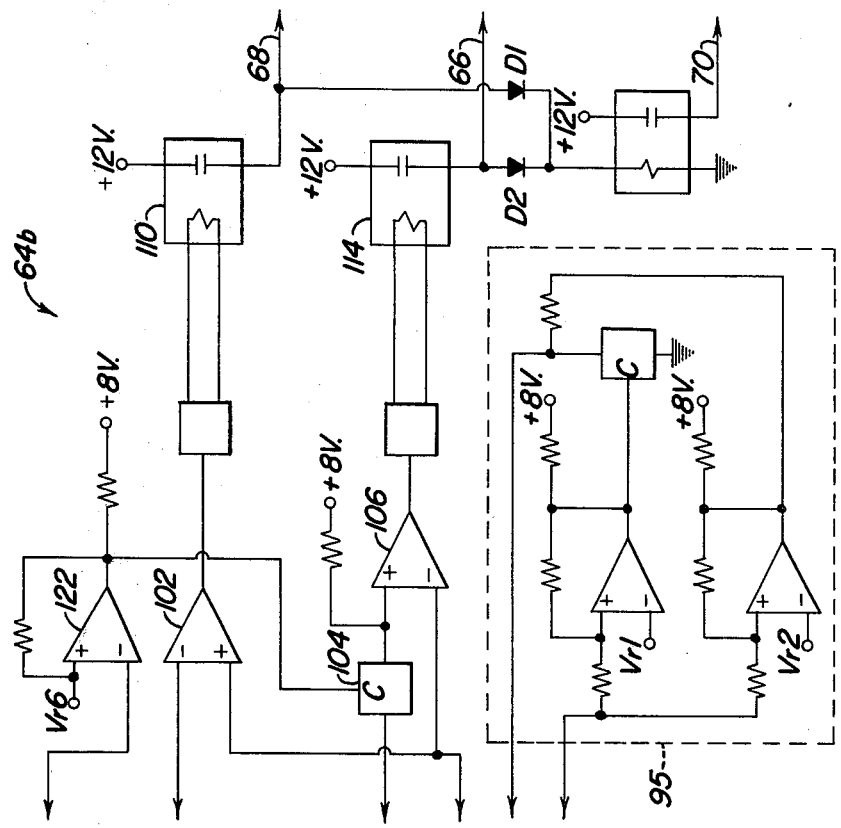

FIGS. 3a and 3b show portions 64a and 64b, respectively, of a prior art version of a control unit for use as the control unit 64 in the control system 22. These prior art control circuits 64a and 64b are also fully described in the aforementioned application, Ser. No. 282,364. Briefly, the control circuits 64a and 64b comprise a dual gain or dual sensitivity control amplifier which energizes either relay 110 or 114 to pivot the spout 14 via hydraulic system 24 to maintain predetermined annular relationships between the spout 14 and the wagon tongue 16. The gain or sensitivity of control circuits 64a and 64b is dependent upon the signal applied to line 97 by switching circuit 95 and communicated to CMOS switches 86 and 90.

Figure 4:
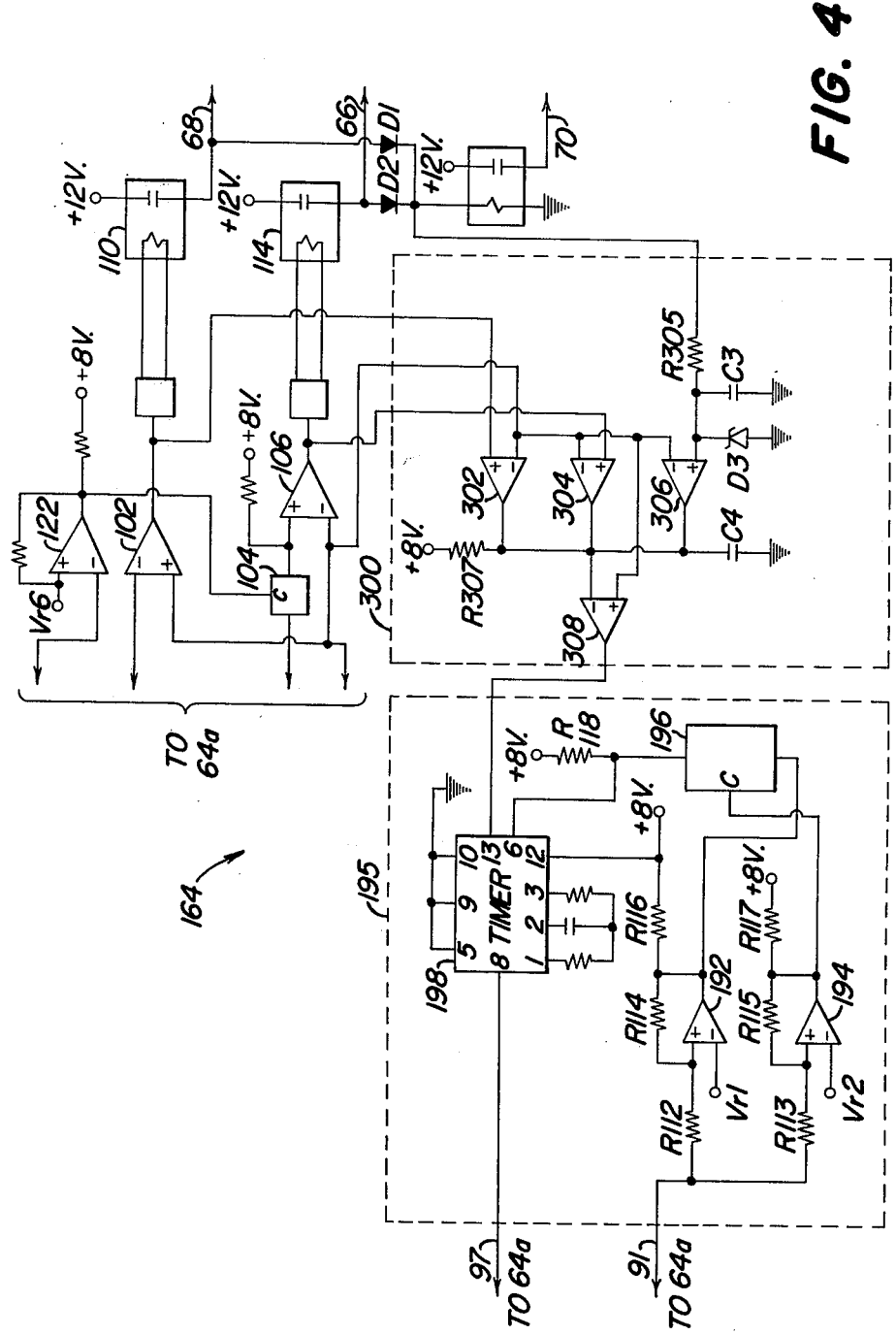

The present invention relates to the improved circuit 164 shown in FIG. 4, whereby the switching circuit 95 of FIG. 3b is replaced by the new switching circuit 195, and whereby the circuit components designated by reference numeral 300 are added to the components of the circuit portion of FIG. 3b. The circuit 164 of FIG. 4, when coupled as indicated with circuit portion 64a of FIG. 3a, constitutes an improved control unit or circuit for use as the control unit 64 of the control system shown in FIG. 2.

More specifically, new circuit 195 includes a pair of comparators 192 and 194 with (+) inputs coupled to line 91 of the original circuit 64a via resistors R112 nd R113. The (−) inputs of comparators 192 and 194 are coupled to original reference voltages Vr1 and Vr2, respectively. The output of comparator 192 is coupled to its (+) input via resistor R114, to +8 volts via resistor R116, and to a terminal of CMOS switch 196. The output of comparator 194 is coupled to its (+) input via resistor R115, to +8 volts via resistor R117 and to the control input, C, of CMOS switch 196.

The other terminal of CMOS switch 196 is coupled to +8 volts via resistor R118 and to pin 6 of a programmable timer 198, such as Motorola No. MC14541B. Pins 5, 9, and 10 of the programmable timer are grounded. Pins 1, 2 and 3 are coupled to an RC circuit which determines the time period required for timer 198 to time out, for example, 10 seconds when pin 13 is high. Pin 8 of timer 198 is coupled via line 97 to CMOS switches 86 and 90 of the portion of original circuit 64a, shown in FIG. 3a. Pin 12 of timer 198 is coupled to +8 volts.

A gating circuit 300 includes a comparator 302 with a (+) input coupled to the output of inverter 102 of original circuit 64b. A comparator 304 has a (+) input coupled to the output of buffer amplifier 106 of original circuit 64b. A comparator 306 has a (+) input coupled via resistor R305 to the common cathode connection of diodes D1 and D2 of original circuit 64b, and to ground via parallel connected voltage limiting zener diode D3 and capacitor C3. The (−) inputs of comparators 302, 304 and 306 are all coupled to the common connection between the (−) inputs of the buffer amplifiers 88 and 106, thereby providing a reference voltage of approximately 3.5 volts to the (−) input of comparators 302–306.

The outputs of comparators 302–306 are tied together, to ground via capacitor C4, to +8 volts via pull-up resistor R307 and to the (−) input of comparator 308. The (+) input of comparator 308 is coupled to the common connection between the (−) inputs of comparators 302–306. The output of comparator 308 is coupled to programming pin 13 of programmable timer 198.

MODE OF OPERATION

When the harvester 10 and wagon 18 are coming out of a relatively gradual turn, the tongue angle will be decreasing as the wagon 18 begins to straighten out after the turn. At some tongue angle, for example, 4 or 6 degrees, the original gain control circuit 95 would immediately switch the system to its low sensitivity mode and the wagon tongue would continue to straighten out while the spout 14 would remain misaligned by this 4 or 6 degree amount.

However, with new gain control or switching circuit 195, pin 8 of timer 198 (and line 97) remain low so that the system remains in its high sensitivity mode for 10 seconds past the time which the tongue angle reaches the aforesaid 4 or 6 degree level. By remaining in this high sensitivity mode, the spout 14 will continue to track to within ½ degree of the wagon tongue 16 as the tongue 16 reaches its straight back position relative to the fore-and-aft axis 20 of the forage harvester 10.

When this 10 second delay period expires, pin 8 of timer 198 (and line 97) goes high to convert the system to its low gain, low sensitivity mode where larger free play between the spout 14 and the tongue 16 is permitted. The particular delay period may be modified, as desired, by coupling an appropriate RC network to pins 1, 2 and 3 of timer 198.

This foregoing description applies when no manual operation of switch module 50 is occurring. However, in some circumstances, the operator may desire to immediately manually pivot the spout 14 with respect to the tongue 16 after coming out of a turn without waiting for the system to switch to the low sensitivity mode after a 10 second delay period expires. Comparator logic circuit 300 permits the operator to immediately pivot the spout 14 relative to the tongue 16 (over an angle range which is larger than that which would be permitted when the system is in its high gain, high sensitivity operational mode) without waiting the 10 seconds normally required for timer 198 to switch the system to its low gain, low sensitivity mode.

More particularly, when the outputs of inverters 102 and 106 are high and relays 110 and 114 are open (as would be the case when no automatic spout correction is being made) and when a voltage of +12 volts occurs at the common cathodes of diodes D1 and D2, (which therefore must be due to a manual closing of switch module 50), then the signal at the outputs of comparators 302–306 and at the the (−) input of comparator 308 goes high.

This causes the output of comparator 308 to be low, thus applying a low level or zero signal to pin 13 of timer 198. The low level signal at pin 13 reduces the time delay provided by timer 198 from 10 seconds to approximately 40 miliseconds, so that when the angle of the wagon tongue 16, with respect to the drawbar 12, decreases to 4 or 6 degrees, for example, the control system switches almost immediately to its low gain or low sensitivity mode. This permits the operator to manually swing the spout 14 almost immediately without interference from the high sensitivity mode of the control system. Note that when the control system is making an automatic correction in the spout position, one or the other of the (+) inputs to comparators 302 or 304 will be low, thus holding the common outputs of comparators 302–306 low. This forces the output of comparator 308 and pin 13 of timer 198 high so that timer 198 will be in its 10 second delay mode until the correction is completed and both (+) inputs of comparators 302 and 304 are high.

When the harvester 10 and wagon 18 are entering a turn and the tongue angle is increasing, the timer 198 does not delay the switching of the system from its low sensitivity to its high sensitivity mode. In other words, when the tongue angle increases to an angle of 9 or 11 degrees, for example, pin 8 of timer 198 (and line 97) switches immediately from high to low to switch the system to its high gain, high sensitivity operational mode wherein the spout 14 is maintained closely aligned with the wagon tongue 16 to prevent crop spillage during the turn.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. In a machine including a crop discharge spout on an agricultural machine, a crop-receiving wagon pivotally attached to the machine and a control system for maintaining predetermined spout-wagon angular relationships, the control system having a first and second operational mode wherein the spout-wagon angular relationship is maintained within first and second angular ranges during first and second ranges of wagon-machine angles, and having means for switching from one to the other of the operational modes when the wagon-machine angle changes from one to other of the wagon-machine angle ranges; the improvement comprising:
   timer means for delaying the switching between operational modes for a predetermined delay time period after the wagon-machine changes from one to the other of the wagon-machine angle ranges.

2. The invention of claim 1, further comprising:
   manually-operated means for manually positioning the spout, the timer means including means coupled to the manually-operated means for reducing the delay time period in response to actuation of the manually-operated means.

3. The invention of claim 1, wherein the timer means comprises:
   a timer having a control input coupled to receive signals from the operational mode switching means, and
   a controlled output having first and second states, triggered by signals applied to the control input, the controlled output switching from its first to its second state a predetermined time interval after application of a particular signal to the control input.

4. The invention of claim 1, wherein the timer means comprises:

a timer having a control input coupled to receive signals from the operational mode switching means; and a controlled output having first and second states triggered by signals applied to the control input, the controlled output switching from its first to its second state a predetermined time interval after application of a particular signal to the control input and a programming input coupled to the manually-operated means.

5. In a machine including a crop discharge spout on an agricultural machine, a crop-receiving wagon pivotally attached to the machine and a control system for maintaining predetermined spout-wagon angular relationships, the control system comprising:

means for switching among a first operational mode wherein the spout-wagon angular relationship is maintained within a first angular range during a first range of wagon-machine angles and a second operational mode wherein the spout-wagon angular relationship is maintained within a second angular range during a second range of wagon-machine angles; and timer means for delaying the operational mode switching for a predetermined delay time period after the wagon-machine angle changes from one to the other of the wagon-machine angle ranges.

6. A system for manually and automatically controlling the position of a crop discharge spout on an agricultural machine having a crop-receiving wagon pivotally attached thereto, comprising:

means for sensing a spout-machine angle and for generating a first signal indicative thereof;

means for sensing a wagon-machine angle and for generating a second signal indicative thereof;

variable gain differential amplifier means for generating an error signal representing a difference between the first and second signals multiplied by the gain thereof;

means for adjusting the gain of the differential amplifier means in response to changes in the second signal, the gain adjusting means comprising bi-stable means for switching from a first output state to a second output state when the second signal increases to a first limit level and for switching from the second output state to its first output state when the second signal decreases to a second limit level smaller than the first limit level, a timer having a control input responsive to the output states of the bi-stable means, a controlled output having first and second states triggered by signals applied to the control input, the controlled output switching from its first state to its second state a predetermined time interval after the bi-stable means switches from its second to its first output state, the controlled output switching from its second to its first state substantially instantaneously in response to the bi-stable means switching from its first to its second output state, the timer also having a programming input for controlling the predetermined time interval, and means for controlling the gain of the differential amplifier depending upon the controlled output of the timer;

means for automatically repositioning the spout in response to the error signal to thereby reduce the magnitude of the error signal;

manually-operated means for manually repositioning the spout; and gate means responsive to actuation of the manually-operated means and coupled to the programming input of the timer for substantially reducing the time interval in response to actuation of the manually-operated means.

* * * * *